April 11, 1939.   C. F. SNYDER   2,154,290
TREAD FOR PNEUMATIC TIRES
Filed Jan. 2, 1937
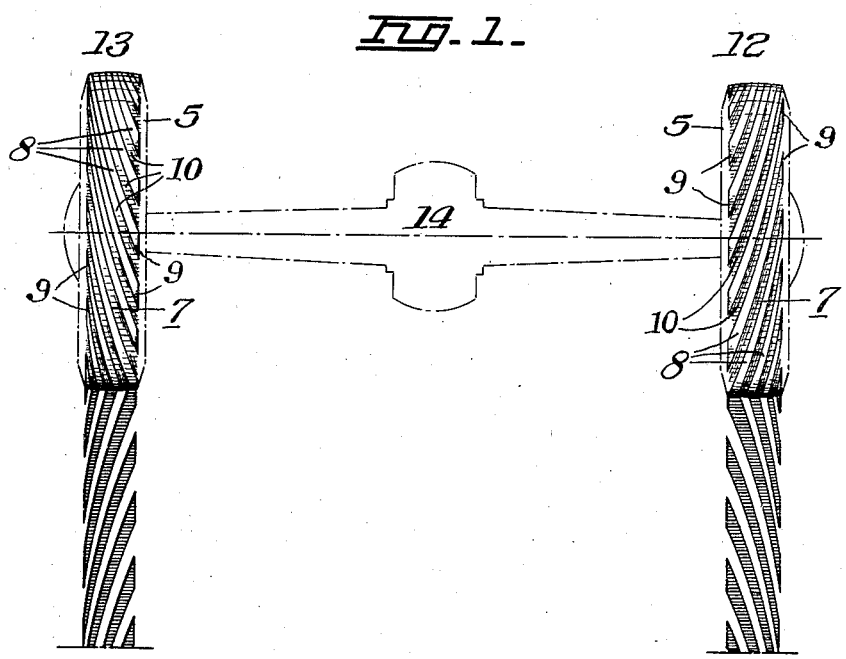
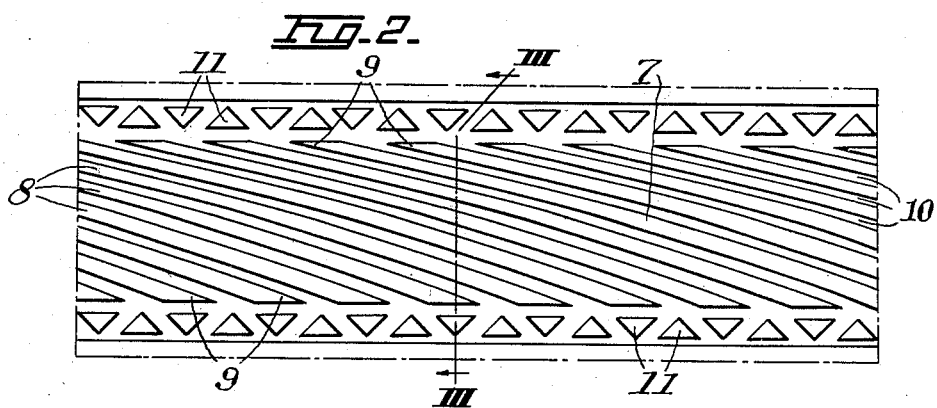
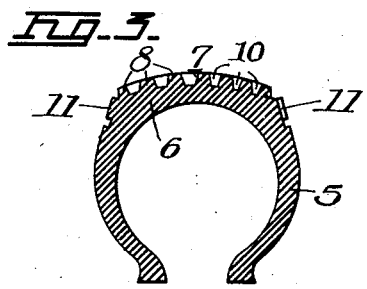
INVENTOR.
Charles F. Snyder
BY
ATTORNEY Patented Apr. 11, 1939

2,154,290

UNITED STATES PATENT OFFICE 2,154,290

TREAD FOR PNEUMATIC TIRES

Charles F. Snyder, Pittsburgh, Pa.

Application January 2, 1937, Serial No. 118,732

5 Claims. (Cl. 152—209)

This invention relates to improvements in treads for tires and particularly to treads for pneumatic tires or the casings thereof of well known construction.

Among the objects of the present invention are; to provide an efficient tread embodying a curved rib and groove design of a character especially applicable for forming on the tread portion of the tire ribs and grooves of either a right hand curvature or a left hand curvature; to provide a pair of tires, one having a tread formed of curved ribs and grooves having a right hand curvature and the other left hand; to provide a tread design that will have an effective traction and resistance to side slip; and a tire tread formed substantially solely of curved diagonally extending ribs separated by curved diagonally extending grooves.

Further objects are; to provide a tread which will create very slight, if any, noise even when driven at high speeds; and a tread that will run smooth and be free of vibrations while in operation.

In the accompanying drawing, which illustrates applications of my invention.

Fig. 1 is a diagrammatic view showing an embodiment of my invention on a pair of automobile wheels mounted on an axle and showing road tracks formed by the treads;

Fig. 2, a plan view of a portion of the tread; and

Fig. 3, a section taken on line III—III of Fig. 2.

Referring to the drawing 5 designates a pneumatic tire or casing and 6 its thickened portion upon which the tread is adapted to be formed.

As illustrated and as preferred my improved tread 7 is made up almost exclusively of continuous ribs and grooves disposed diagonally of the tread surface and extending substantially across the width thereof. The ribs 8 are curved and slightly tapering, the taper extending from the inner side of the casing towards its outer side with the ends of the ribs preferably terminating in relative sharp tapering portions as 9. The ribs are separated by curved diagonally extending grooves 10 which also extend substantially throughout the width of the tread.

The radius of curvature of the ribs and the interposed grooves may vary somewhat depending upon the wheel base of the automobile and the size of the tires applied to the car. In all cases however, the curvature should be sufficient to reduce vibrations to the least possible degree thereby insuring smooth running and the grooves should be of such a character as to obviate the formation of air pockets therein or in connection therewith.

Adjacent opposite edges of the tread portion and located on the sides of the casing, I have shown a series of spaced apart triangular shaped projections 11; these projections, however, may be of a different shape than that illustrated.

My invention contemplates the formation of both right and left hand curvatures on the treads of a pair of tires applied to two automobile wheels, thus, a right hand wheel of the car may be provided with a tread having its ribs and grooves comprising left hand curvatures while the other wheel of the pair may have its tread formed with ribs and grooves of an opposite curvature. The shape of the ribs and grooves particularly enables the formation of the right and left curvatures and in operation it will be evident that the thrust will be inwardly towards the longitudinal axis of the automobile thus effectively enabling the treads to resist side slip.

In connection with my invention I have shown diagrammatically, a pair of automobile wheels comprising a right wheel 12 and a left wheel 13 of the usual or any preferred construction mounted on an axle structure 14, with the pair of treads 7 of the pneumatic tires formed with the above described right hand and left hand curvatures; the treads 7 having the left hand curvature being mounted on the right hand wheel 12 and the tread having the ribs and grooves of right hand curvature being applied to the left wheel 13.

This diagrammatic view also shows the road surface tracks produced by the treads embodying my invention and illustrates the action of the diagonally disposed and continuous ribs and grooves constituting the tread in producing good road traction and effective resistance to side slip.

Attention is called to the fact that the ribs of the tread of my construction, when the tire is moving on a road, have initial engagement with the road surface at the outer portion of the tread and that they continue in contact with the road surface during rotation of the tire in a curved path diagonally of the tread portion. The ribs thus function to provide inwardly advancing contact in the direction of lineal movement of the tire.

I claim:

1. A pneumatic tire having a peripheral tread provided with a plurality of unidirectional curved diagonally disposed closely spaced narrow ribs, said ribs extending substantially entirely across the tread of the tire, said ribs tapering substantially continuously from one side of the tire to the other side thereby providing rib portions of greater contact area at one side of the tread, and narrow uninterrupted grooves of a curvature corresponding with the curvature of the ribs separating the ribs.

2. A pneumatic tire having a peripheral tread provided with a plurality of diagonally disposed ribs extending substantially entirely across the tread of the tire, said ribs tapering substantially continuously from one side of the tire to the other side thereby providing rib portions of greater contact area at one side of the tread, said ribs being separated by relatively narrow grooves.

3. A pneumatic tire having a peripheral tread provided with a plurality of right-hand unidirectionally curved diagonally disposed ribs extending substantially entirely across the width of the tread, said ribs being separated by closely spaced narrow grooves of a curvature corresponding to the curvature of the ribs, said ribs and grooves tapering across the tread substantially from the outer side of the tire to the inner side of the tire and providing rib portions of greater wearing area at the inner side of the tire.

4. A pneumatic tire having a peripheral tread provided with a plurality of left-hand unidirectionally curved diagonally disposed ribs extending substantially entirely across the width of the tread, said ribs being separated by closely spaced narrow grooves of a curvature corresponding to the curvature of the ribs, said ribs and grooves tapering across the tread substantially from the outer side of the tire to the inner side of the tire and providing rib portions of greater contact area at the inner side of the tread.

5. A pneumatic tire having a plurality of closely spaced unidirectional curved and diagonally disposed ribs having relatively sharp tapering terminal end portions, each rib extending substantially entirely across the width of the tread and tapering continuously from one end portion to the other end portion, whereby to provide ribs having wear portions of greater area at one side of the tread, said ribs being separated by narrow uninterrupted grooves of a curvature corresponding to the curvature of the ribs.

CHARLES F. SNYDER.